United States Patent [19]
Sato et al.

[11] Patent Number: 5,857,327
[45] Date of Patent: Jan. 12, 1999

[54] MUFFLER FOR AN INTERNAL COMBUSTION ENGINE

[75] Inventors: Shigeru Sato; Yukio Sakaguchi, both of Saitama; Kengo Kubo, Kanagawa, all of Japan

[73] Assignee: Kioritz Corporation, Tokyo, Japan

[21] Appl. No.: 876,386

[22] Filed: Jun. 17, 1997

[30] Foreign Application Priority Data

Jun. 21, 1996 [JP] Japan ................................. 8-161686

[51] Int. Cl.⁶ .................................................. F01N 3/10
[52] U.S. Cl. .......................... 60/302; 60/323; 60/319; 181/262
[58] Field of Search .......................... 60/299, 302, 314, 60/319, 323; 181/262, 272, 283, 230, 231, 232

[56] References Cited

U.S. PATENT DOCUMENTS

5,426,269  6/1995  Wagner et al. .......................... 181/258
5,521,339  5/1996  Despain et al. .......................... 181/230
5,738,184  4/1998  Masuda et al. .......................... 181/262

*Primary Examiner*—Edward K. Look
*Assistant Examiner*—Binh Tran
*Attorney, Agent, or Firm*—Baker & Botts, L.L.P.

[57] ABSTRACT

A muffler for an internal combustion engine has an expansion chamber (31, 32) into which exhaust gas from the engine is introduced. The expansion chamber has a double wall (32A), with an inner panel (42) of the double wall (32A) having exhaust gas discharge portions (42A, 42B, 42C, 42D) with respective blowout holes (61, 62, 63, 64) for introducing the exhaust gas from the expansion chamber (32) into an air space (Sb) in the double wall (32A). From the air space (Sb), the exhaust gas is vented to the ambient through a discharge hole (37A) in an outer panel (42) of the double wall (32A). A spark arrester screen (72) covers the discharge hole (37A).

10 Claims, 6 Drawing Sheets

MUFFLER FOR AN INTERNAL COMBUSTION ENGINE

BACKGROUND OF THE INVENTION

This invention relates to a muffler for an internal combustion engine such as a small air-cooled two-stroke gasoline engine which is suited for use in a portable small working machine such as a bush cutter or a chain saw, and, more particularly, to a muffler for preventing sparks from being discharged from the internal combustion engine and for minimizing final exhaust gas temperature.

In view of increasing environmental concerns with combustion products, reduced amounts of HC, CO, NOx and the like in engine exhaust gas are now mandated even for internal combustion engines such as small air-cooled two-stroke gasoline engines for use in portable small working machines such as bush cutters and chain saws. For example, according to an exhaust gas control bill in California, known as CARB TIER 2, limits on these noxious gases are becoming progressively more restrictive year by year starting in 1998.

In view of such exhaust gas regulations, the muffler disclosed in Japanese Patent Application H8-84260 has an expansion chamber into which exhaust gas emitted from the engine exhaust port is introduced. The expansion chamber is perpendicularly divided by a partition plate into a first expansion chamber and a second expansion chamber. The partition plate is provided with an exhaust emission purifier such as an oxidation catalyst in the form of a gas-permeable metallic foamed body. Exhaust gas introduced into the first expansion chamber then passes via the exhaust emission purifier to the second expansion chamber.

The Japanese Patent Application H8-84260 also discloses a muffler wherein, additionally, the outer wall of the expansion chamber is formed of a double wall consisting of an inner panel and an outer panel which are spaced apart by a suitable distance so as to form an air space therebetween.

The muffler disclosed in the Japanese Patent Application H8-84260 has been found to be highly effective in reducing THC components in an exhaust gas. However, after passing through the oxidation catalyst, hot exhaust gas is discharged immediately and directly from the second expansion chamber via a tail pipe of the muffler to the ambient, and there is a risk of live sparks being discharged to the ambient, and of the final exhaust gas temperature exceeding the upper limit mandated by the aforementioned regulation.

SUMMARY OF THE INVENTION

It is an object of the present invention to provide a muffler for an internal combustion engine which reliably prevents sparks from being discharged to the ambient, and which minimizes the final exhaust gas temperature.

For realizing the aforementioned objects, in accordance with an aspect of the invention, a muffler for an internal combustion engine has an expansion chamber into which an exhaust gas from the exhaust port of the internal combustion engine is introduced. The outer wall of the expansion chamber has an inner panel and an outer panel which is spaced apart from the inner panel by a suitable distance so as to form an air space therebetween. The inner panel has a blowout hole for emitting the exhaust gas from the expansion chamber into the air space, and the outer panel has a discharge hole for discharging the exhaust gas from the air space into the ambient.

In a preferred embodiment of the invention, a part of the inner panel is embossed toward the outer panel so as to form several louver-like exhaust gas discharge portions resulting in several blowout holes. Exhaust gas in the expansion chamber passes through the exhaust gas discharge portions and the blowout holes into the air space, and is guided between the inner and outer panels to the discharge hole.

Preferably, a predetermined space is formed between the exhaust gas discharge portions and the outer panel.

Preferably also, the discharge hole is disposed at the rear of the outer panel, i.e. away from the engine. Furthermore, the orientation of the blowout holes preferably is such that exhaust gas is introduced into the air space in a direction toward the discharge hole, and the distances between each of the blowout holes and the discharge hole along the flow of exhaust gas are different from each other.

According to a preferred further embodiment of the invention, an exhaust gas-guiding member having a final discharge port for discharging the exhaust gas from the air space to the ambient is formed so as to cover the discharge hole.

In a preferred muffler according to the invention, the expansion chamber is perpendicularly divided by a partition plate into a first expansion chamber and a second expansion chamber, and the partition plate is provided with an exhaust emission purifier such as an oxidation catalyst. Accordingly, exhaust gas from the exhaust port of the engine is introduced into the first expansion chamber and then passes via the exhaust emission purifier to the second expansion chamber which includes the exhaust gas discharge portion, the blowout hole and the discharge hole.

According to a preferred further embodiment of the invention, the first expansion chamber is provided, in the vicinity of the engine exhaust port, with an ambient air inlet means for aspirating ambient air into the first expansion chamber by taking advantage of the jet flow of the exhaust gas.

In a preferred embodiment of a muffler according to the invention, exhaust gas emitted from the engine exhaust port is introduced into the first expansion chamber at high, near-sonic velocity, and the exhaust gas thus introduced into the first expansion chamber is expanded and diffused in the first expansion chamber for noise attenuation.

As a result of the pressure difference due to increased gas pressure in the first expansion chamber as compared with the second expansion chamber which is separated from the first expansion chamber by the partition plate, the exhaust gas introduced into the first expansion chamber then passes via the oxidation catalyst which penetrates through the partition plate, into the second expansion chamber. Since the exhaust gas can react efficaciously with oxygen (oxidative combustion) in the first expansion chamber by the effects of the oxidation catalyst, the amounts of CO and HC contained in the exhaust gas are reduced significantly.

In the second expansion chamber, the exhaust gas is expanded and diffused further, thereby further attenuating the exhaust noise. Thereafter, the exhaust gas is blown out through the blowout hole of the inner panel into the air space between the inner panel and the outer panel, and then guided through the air space to the discharge hole of the outer panel. Exhaust gas thus guided to the discharge hole is then transferred through an exhaust gas-guiding member covering the discharge hole to the final discharge port of the exhaust gas-guiding member so as to be discharged therefrom in a preselected direction to the ambient.

In a muffler according to the invention, exhaust gas is blown out from the second expansion chamber via a blowout hole to an air space in the double-wall portion, and then guided through the air space to the discharge hole. Since a significantly larger air space is used as a gas flow passage as compared with a conventional exhaust gas flow passage such as a tail pipe, the exhaust gas cools down sufficiently as it passes through the air space. As a result, the final exhaust gas temperature is reduced significantly, and sparks are extinguished in the air space.

As the exhaust gas blown out from the blowout hole expands rapidly in the air space, the noise level also is reduced significantly.

When a spark arrester screen covers the discharge hole, sparks are prevented fully from being discharged to the ambient. And, with the spark arrester screen disposed remote from the blowout hole, the spark arrester screen is not exposed to exhaust gas at high temperature. This enhances durability and minimizes clogging of the spark arrester screen.

In a muffler of the invention, the flow of exhaust gas is guided by the louver-like exhaust gas discharge portions formed at the inner panel for discharge from the blowout holes into the air space in a direction along the inner panel and the outer panel. Thus, the blowout direction of exhaust gas is changed by the exhaust gas discharge portions for flow along the outer panel, for reduced loss in discharge pressure of the exhaust gas and reduced back pressure.

With a suitable space interposed between the exhaust gas discharge portions and the outer panel, the outer panel is not directly impinged by high-temperature exhaust gas. Thus, the portion of the outer panel in the vicinity of the blowout hole is not unduly heated locally, and thermal stress is minimized.

When the distances from each of the blowout holes to the discharge hole along the flow of exhaust gas are different from each other, wave interference results in further noise attenuation.

DETAILED DESCRIPTION OF A PREFERRED EMBODIMENT

Figure 1:
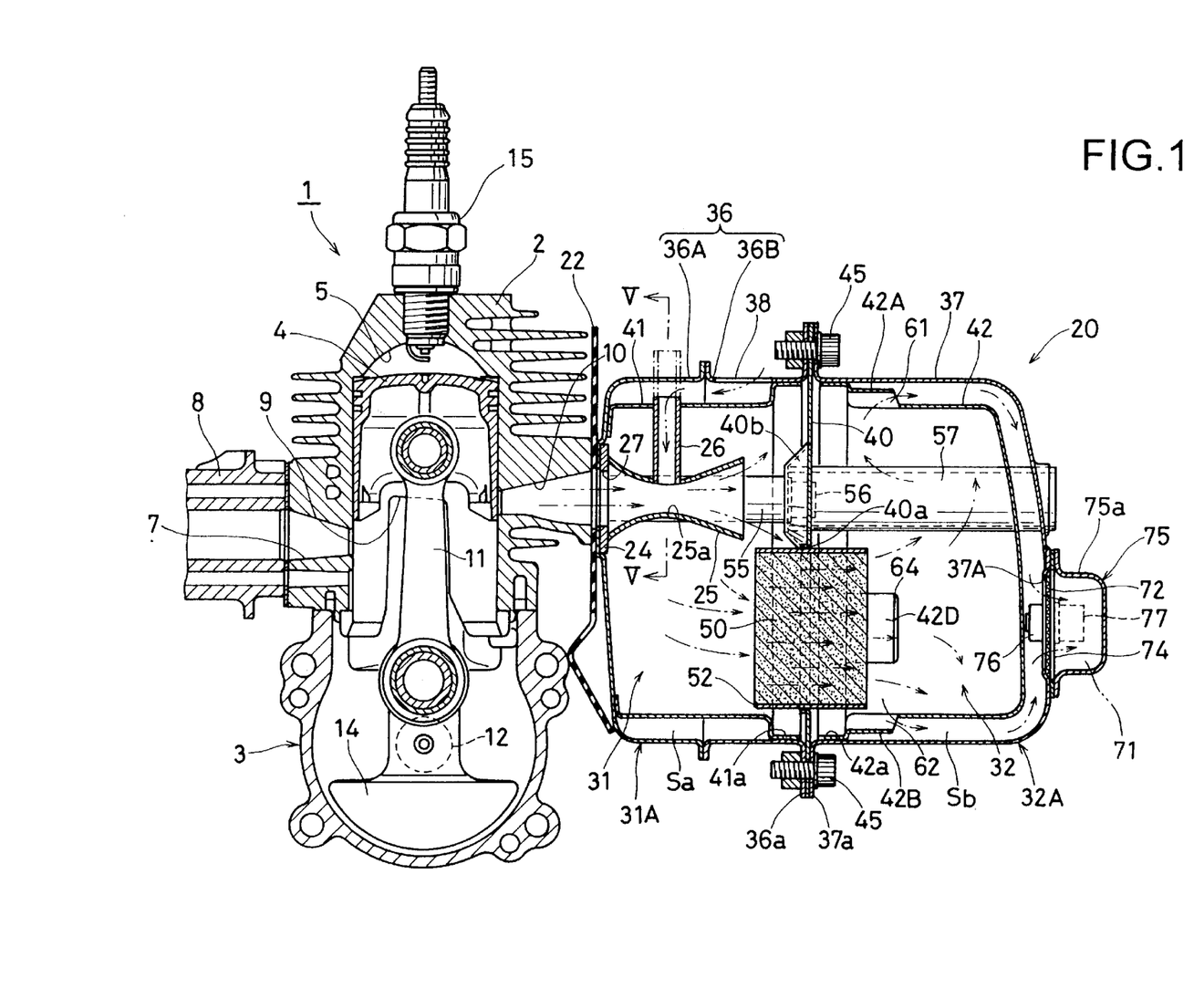
FIG. 1 is a longitudinal sectional view illustrating one embodiment of a muffler according to the invention, together with a small air-cooled two-stroke gasoline engine to which the muffler is attached.

FIG. 1 shows the internal combustion engine 1 which is a small air-cooled two-stroke gasoline engine of Schnürle scavenging type, hereinafter referred to as "engine" for short, which is typically included as a power source in a portable working machine such as a bush cutter or a chain saw, and which has a displacement of about 23 cc. The engine 1 comprises a cylinder 2 having a semi-spherical combustion chamber 5 provided with an spark plug 15, a crank case 3 disposed below and in communication with the cylinder 2, a piston 4 movably fitted in the cylinder 2, an intake port 7 in communication with an air-fuel mixture-feeding passages 8 and an exhaust port 10 in communication with a muffler 20 in a predetermined manner as described hereinafter disposed on both sides as viewed in FIG. 1, and two scavenging ports 9 which are disposed at respective front and rear sides (as viewed in FIG. 1) in a predetermined manner.

As in an conventional internal combustion engine, the reciprocating up-and-down motion of the piston 4 is converted via a connecting rod 11 to rotational motion of a crank shaft 12 which is provided with a balance weight 14, with the shaft output thereof being utilized as motive power of the portable working machine.

The muffler 20 according to this embodiment is attached via a heat-insulating plate 22 to the outside portion of the exhaust port 10. The muffler 20 has a first expansion chamber 31 and a second expansion chamber 32 which are separated by a partition plate 40 disposed vertically, i.e. in the direction of height of the internal combustion engine 1. For the partition plate 40, a stainless steel (SUS) plate is used, having reduced heat conductivity of about one third as compared with an ordinary carbon steel plate.

The first expansion chamber 31 comprises a double wall portion 31A consisting of a box-shaped inner panel 41 whose left and right sides (as viewed in FIG. 1) are open, and an outer panel 36 whose right side (as viewed in FIG. 1) is open, and the partition plate 40, in combination forming a rectangular parallelepiped. The outer panel 36 is provided, at a portion thereof which corresponds to the outer side portion of the exhaust port 10, with a reinforcing plate 24, and also with an exhaust gas inlet port 27 for introducing the exhaust gas emitted from the exhaust port 10 into the muffler 20 (see also FIG. 5).

A portion of the inner panel 41 facing the internal combustion engine 1, and an enlarged-diameter portion 41a of the inner panel 41 remote from the internal combustion engine 1, are hermetically sealed by welding to corresponding portions of the outer panel 36. Except for the hermetically sealed portions, the inner panel 41 and the outer panel 36 are spaced apart from each other by a suitable distance, thus forming a first air space "Sa"therebetween. The outer panel 36 consists of a left panel 36A proximal to the internal combustion engine 1, and a right panel 36B distal from the internal combustion engine 1. The panels 36A and 36B are hermetically sealed to each other at their respective flange portions.

The second expansion chamber 32 comprises a double-wall portion 32A consisting of an outer panel 37 and a box-shaped inner panel 42 whose left side (as viewed in FIG. 1) is open. The double-wall portion 32A and the partition plate 40 together form a rectangular parallelepiped. An enlarged-diameter portion 42a of the inner panel 42, proximal to the internal combustion engine 1, is hermetically sealed by welding to a corresponding portion of the outer panel 37. Except for the hermetically sealed portion, the inner panel 42 and the outer panel 37 are spaced apart from each other by a suitable distance, thus forming a second air space "Sb" therebetween.

The outer panels 36 and 37, each forming an outer wall of the first expansion chamber 31 and the second expansion chamber 32, respectively, are provided with flange-like terminal portions 36a and 37a which are hermetically sealed to each other by means of a suitable number of bolts and nuts 45, with the partition plate 40 being interposed therebetween.

Figure 4:
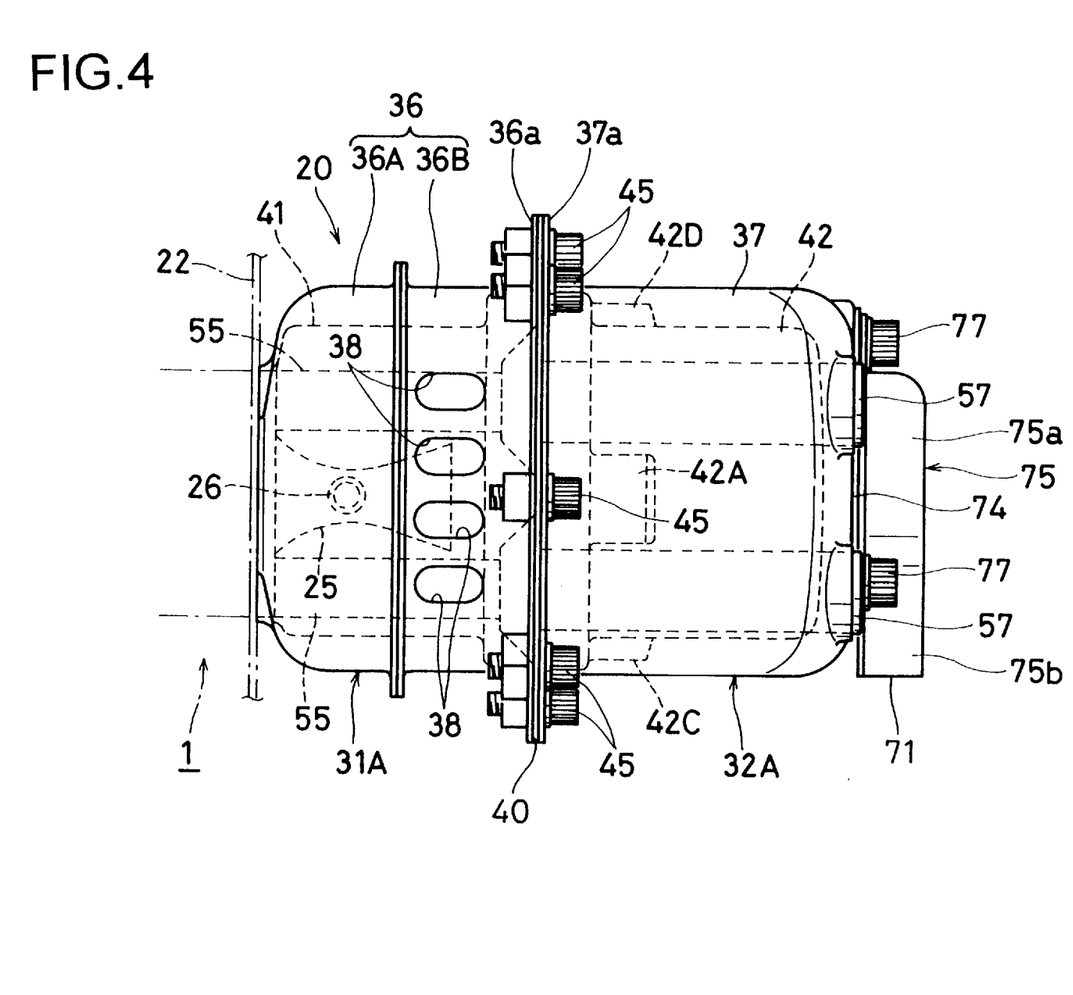
FIG. 4 is a plan view of the muffler shown in FIG. 1.

As shown in FIG. 4, a number (four in this embodiment) of side-by-side oval-shaped openings 38 are formed close to the partition plate 40, at the upper side of the periphery of the outer panel 36 (36B) of the first expansion chamber 31.

As shown, the openings 38 are preferably disposed at the upper side of the muffler 20, this being in the interest of minimizing heat radiation to the engine. Alternatively, for shielding against rain, the openings 38 can be disposed at the underside of the muffler 20.

A columnar oxidation catalyst 50 comprising a metallic carrier is disposed as an exhaust emission purifier at the lower portion of the partition plate 40 in such a manner that the columnar oxidation catalyst 50 penetrates across the thickness of the partition plate 40, i.e. the columnar oxidation catalyst 50 protrudes into the first expansion chamber 31 as well as into the second expansion chamber 32. More specifically, a circular opening 40a for mounting a catalyst is formed at a lower portion of the partition plate 40, and a cylindrical shell 52 made of stainless steel (SUS) is inserted into the catalyst-mounting opening 40a and fixed therein by means of welding, for example. The shell 52 is integrally provided with the columnar oxidation catalyst 50 comprising the metallic carrier.

As the oxidation catalyst 50, which is formed integral with the shell 52, is mounted so as to be supported by the partition plate 40, the oxidation catalyst 50 can be of simple shape, and changing the size or location and exchanging/installing the oxidation catalyst are facilitated.

The oxidation catalyst is not limited to one comprising a metallic carrier in a cylindrical shell, but can be an oxidation catalyst comprising a metallic carrier without a cylindrical shell, an oxidation catalyst formed of a gas-permeable foamed body having a box-like shape, or an oxidation catalyst composed of a ceramic carrier. The catalyst can be of any suitable type and shape.

Two concave portions 40b for fitting therein the head portion of bolt 56 for fastening the muffler 20 to the cylinder 2 are formed at a portion of the partition plate 40 which is located above the oxidation catalyst 50, approximately at the level of the exhaust port 10 of the internal combustion engine 1, and approximately at the level of the exhaust gas inlet port 27. The concave portions 40b are formed on the partition plate 40 so as to protrude into the first expansion chamber 31.

Two fastening sleeves 55 are disposed in the first expansion chamber 31 approximately at the level of the exhaust port 10 and the exhaust gas inlet port 27 so as to interconnect the aforementioned concave portions 40b with the reinforcing plate 24. Two bolt-insertion sleeves 57 are fixed in the second expansion chamber 32 so that each of the bolt-insertion sleeves 57 is disposed coaxial with each of the fastening sleeves 55 (see also FIGS. 2 to 4).

For attachment of the muffler 20 to the cylinder 2, two bolts 56 are introduced from the right side of the muffler 20 from the bolt-insertion sleeves 57 into the fastening sleeves 55, and then the tip of an external thread is engaged with the internal thread (not shown) correspondingly formed at the cylinder 2, thereby firmly fastening the muffler 20 to the cylinder 2 via the partition plate 40 and the fastening sleeves 55.

Conceivably, for attachment of the muffler 20 to the internal combustion engine 1, a bolt may be employed having sufficient length for insertion into the cylinder 2 from the far right side of the muffler 20, for the bolt to traverse both the second expansion chamber 32 and the first expansion chamber 31. However, because of the length of such a bolt, attachment stability and reliability of the muffler 20 may be impaired. By contrast, when the bolt is fastened by making use of the partition plate 40 as illustrated by this embodiment, a shorter bolt can be used for enhanced fastening strength. Moreover, with concave portions 40b formed on the partition plate 40 as described, the bolts 56 can be shortened further by the depth of the concave portions 40b, for more stable and reliable fastening of the muffler 20 to the cylinder 2.

The concave portions 40b also serve as reinforcing ribs for the partition plate 40, thus enhancing the structural strength of the partition plate 40 and additionally serving to suppress vibration due to exhaust gas pulsation.

The volume of the muffler 20 according to this embodiment is relatively large as compared with that of a conventional internal combustion engine of almost the same displacement, namely by a factor of 1.5 to 2, for example, or about 18 times engine displacement.

Figure 5:
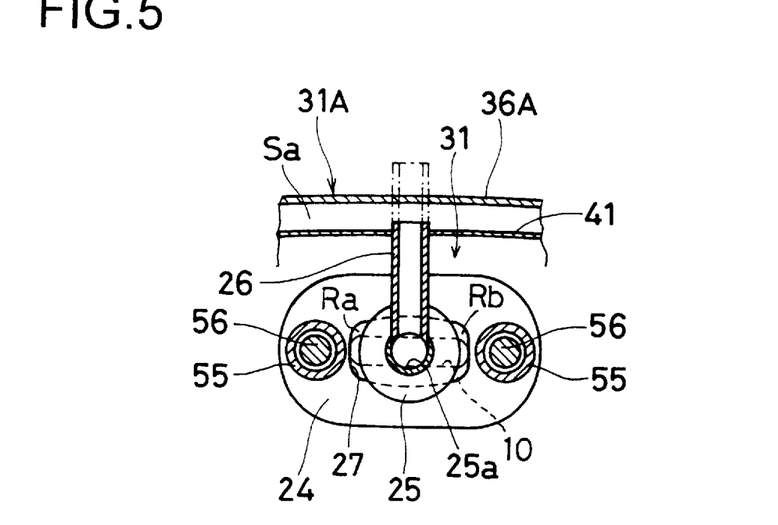
FIG. 5 is a cross-sectional view taken along the line V—V of FIG. 1.

In addition to the aforementioned construction, an ambient air inlet means is disposed in the vicinity of the exhaust gas inlet port 27 formed in the first expansion chamber 31, for aspirating ambient air into the first expansion chamber 31 by taking advantage of the jet flow of the exhaust gas. The ambient air inlet means comprises a Venturi tube 25 extending along the jet flow direction of the exhaust gas so as to allow the exhaust gas to pass therethrough, and an ambient air inlet tube 26 disposed for communication between the throat portion 25a of the Venturi tube 25 and the air space "Sa". The Venturi tube 25 is affixed to the reinforcing plate 24, and the ambient air inlet tube 26 is affixed to the inner panel 41, both by welding, for example. The outer diameter upstream of the Venturi tube 25 is slightly less than the width of the outer end portion of the exhaust port 10 (the same as the width of the exhaust gas inlet port 27) of the internal combustion engine 1, as shown in FIG. 5, so that the outer end portion of the exhaust port 10 as well as the exhaust gas inlet port 27 are not completely covered (as viewed from the downstream side) by the Venturi tube 25, thus forming a pair of gaps Ra and Rb on both sides of the upstream end portion of the Venturi tube 25. The gaps Ra and Rb are formed not only to simplify the manufacture of the Venturi tube 25, but also to allow a portion of the jet flow of the exhaust gas to bypass the Venturi tube 25 and to pass through the gaps Ra and Rb instead, thus avoiding obstruction of the exhaust gas flow, thereby providing for a smooth gas exchange in the combustion chamber 5, and thereby minimizing power loss.

Figure 2:
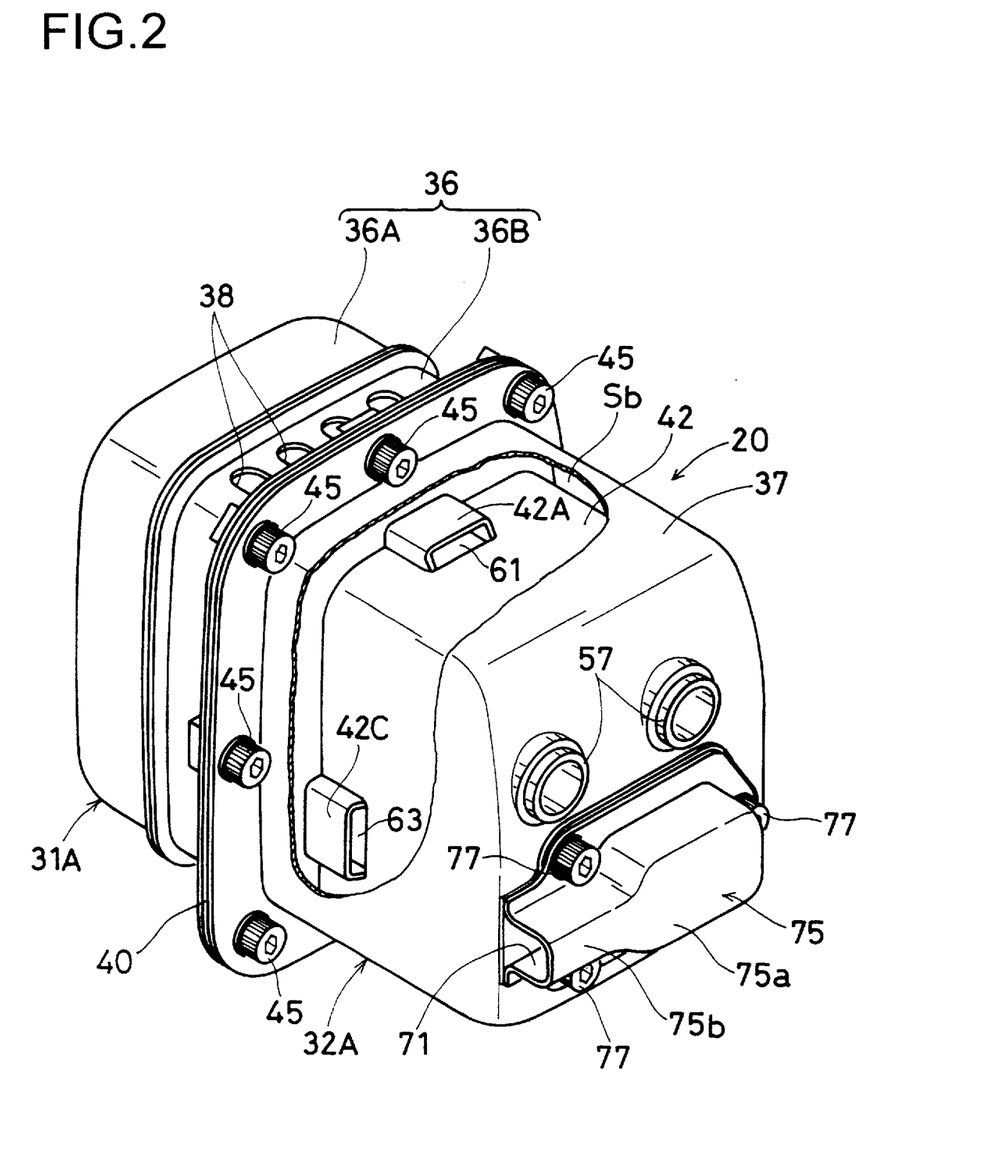
FIG. 2 is a partially sectioned perspective view of the muffler shown in FIG. 1.
Figure 3:
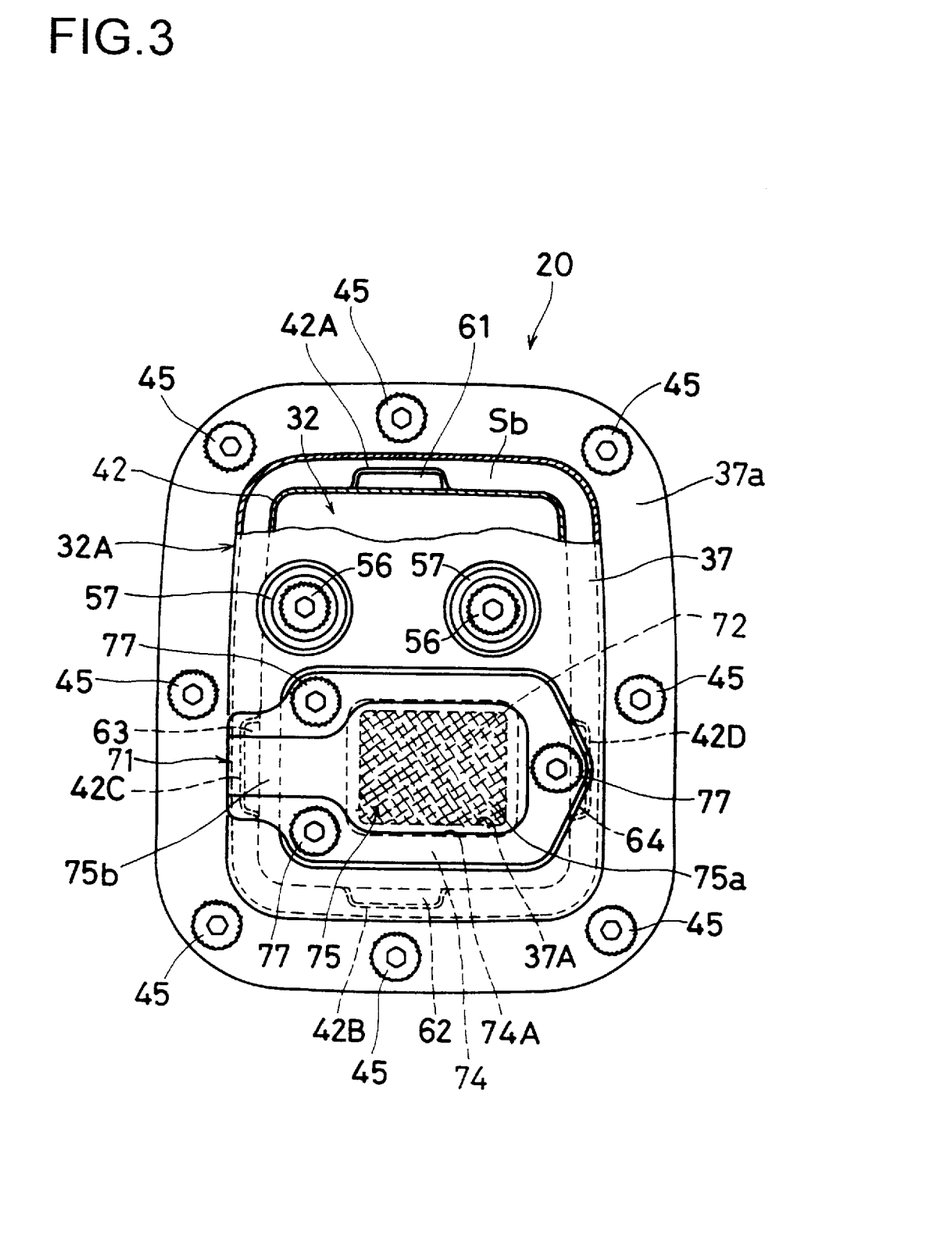
FIG. 3 is a partially sectioned view showing the back side of the muffler shown in FIG. 1.
Figure 6:
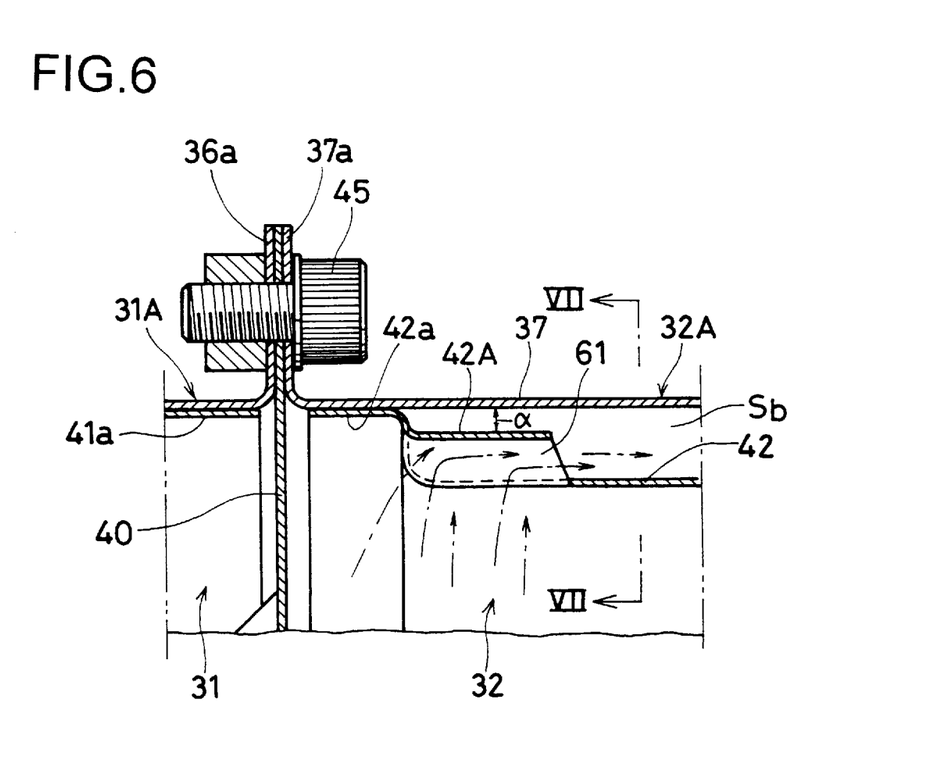
FIG. 6 is an enlarged sectional view illustrating a portion of the muffler shown in FIG. 1.
Figure 7:
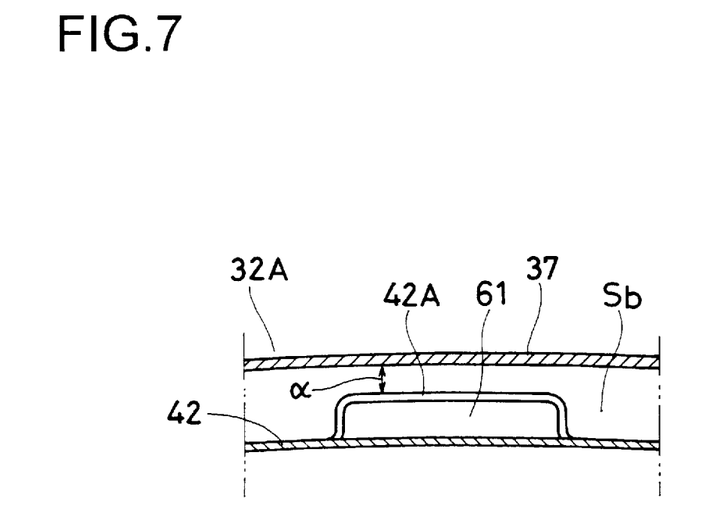
FIG. 7 is a cross-sectional view taken along the line VII—VII of FIG. 6.

As shown in FIGS. 2 to 4, in the muffler 20 of this embodiment, parts of the inner panel 42 of the second expansion chamber 32, predetermined portions (four in this embodiment, i.e. the top, bottom, left and right portions) of the inner panel 42 which are located close to the enlarged-diameter portion 42a of the inner panel 42, are embossed toward the outer panel 37, thus forming four louver-like exhaust gas discharge portions 42A, 42B, 42C and 42D having approximately rectangular blowout holes 61, 62, 63 and 64, respectively. A representative top blowout hole 61 is shown in FIGS. 6 and 7. Accordingly, the exhaust gas in the expansion chamber 32 passes through the exhaust gas discharge portions 42A, 42B, 42C and 42D to the blowout holes 61, 62, 63 and 64, and then to the interior of the second air space "Sb", so that the exhaust gas is guided between the inner panel 42 and the outer panel 37 in a direction away from the engine 1.

As represented by the exhaust gas discharge portion 42A in FIGS. 6 and 7, a predetermined gap $\alpha$ (about 2 to 3 mm)

is formed between the exhaust gas discharge portions 42A, 42B, 42C and 42D and the outer panel 37. A rectangular discharge hole 37A for discharging the exhaust gas from the second air space "Sb" is formed at a lower portion of the back side of the outer panel 37 away from the engine 1, and a spark arrester screen 72 made of stainless steel is disposed covering the discharge hole 37A. An exhaust gas-guiding member 75 provided with a final discharge port 71 for discharging the exhaust gas from the second air space "Sb" is disposed covering the outside of the discharge hole 37A and the spark arrester screen 72.

A rectangular nut 76 is affixed by welding to each of three portions of the back surface of the peripheral portion of the discharge hole 37A formed in the outer panel 37. The spark arrester screen 72 is disposed on the outside of the outer panel 37. The exhaust gas-guiding member 75 is disposed such that the spark arrester screen 72 and a rectangular ring-like packing 74 placed outside the spark arrester screen 72 are held between the exhaust gas-guiding member 75 and the peripheral portion of the discharge hole 37A of the outer panel 37. The exhaust gas-guiding member 75 is fastened by introducing hexagon socket head cap screws 77 from the outside of the exhaust gas-guiding member 75, and then engaging each of the hexagon socket head cap screws 77 with one of the nuts 76.

The exhaust gas-guiding member 75, having a bottle-like shape in plan view, comprises a box-like main body 75a having an open bottom face and an open side face, and a discharge passage portion 75b communicating with the open side face of the exhaust gas-guiding member 75 and having an open bottom face and one open side face. The final exhaust gas discharge port 71 in the muffler 20 is formed by the open outer end portion (or open side face) of the discharge passage portion 75b.

The blowout holes 61, 62, 63 and 64 face away from the engine 1 (i.e. toward the rear side of the muffler 20), so that the exhaust gas introduced into the second air space "Sb" will flow toward the discharge hole 37A. The exhaust gas discharge portions 42A and 42B which are disposed at the top and bottom of the inner panel 42, respectively, as well as the blowout holes 61 and 62 thereof are displaced toward the left side from the center of the muffler 20 (as viewed from the rear side of the muffler 20), and the exhaust gas discharge portions 42C and 42D which are disposed at the left and right of the inner panel 42, respectively, as well as the blowout holes 63 and 64 thereof are displaced toward the lower side from the center of the muffler 20 (as viewed from rear side of the muffler 20), so as to make the distances along the exhaust gas flow from the blowout holes 61, 62, 63 and 64 to the final discharge port 71 different from each other.

Exhaust gas emitted from the exhaust port 10 of the engine 1 first is forced through the Venturi tube 25 as indicated by a dot and dash line in FIG. 1, and then introduced into the first expansion chamber 31 at near-sonic velocity for expansion and diffusion therein, thereby to attenuate the exhaust noise.

As a result of a pressure difference due to increased gas pressure in the first expansion chamber 31 as compared with that in the second expansion chamber 32 which is separated from the first expansion chamber 31 by the partition plate 40, the exhaust gas introduced into the first expansion chamber 31 is then forced via the exposed side of the oxidation catalyst 50 into the interior of the oxidation catalyst 50 which penetrates through the partition plate 40. Then, after passing through the small pores in the oxidation catalyst 50, the exhaust gas is introduced into the second expansion chamber 32. Owing to the oxidation catalyst 50, the exhaust gas can efficaciously react with oxygen (oxidative combustion) in the first expansion chamber 31.

When the exhaust gas blows through the Venturi tube 25 provided with the aforementioned ambient air inlet means, the terminal portion of the ambient air inlet tube 26, which is connected to the throat portion 25a of the Venturi tube 25, is evacuated (negative pressure) due to the jet flow of the exhaust gas, so that ambient air from outside the outer panel 36 is aspirated, thereby causing the ambient air to be introduced into the first air space "Sa" via the openings 38 formed on the upper surface of the outer panel 36 as shown by a two-dot and dash line in FIG. 1, and then into the Venturi tube 25 via the ambient air inlet tube 26. The ambient air thus introduced into the Venturi tube 25 is subsequently fed together with the exhaust gas to the first expansion chamber 31.

When the ambient air is aspirated into the first expansion chamber 31, the amount of $O_2$ in the first expansion chamber 31 is increased, thereby promoting oxidation reaction of CO, and thus remarkably reducing CO.

After passing through the oxidation catalyst 50, the exhaust gas introduced from the first expansion chamber 31 expands again in the second expansion chamber 32 so that exhaust noise is further attenuated. The exhaust gas is then discharged from each of the blowout holes 61, 62, 63 and 64 formed on the inner panel 42, and blown into the second air space "Sb" formed between the inner panel 42 and the outer panel 37. After passing through the second air space "Sb", the exhaust gas is guided to the discharge hole 37A formed in the outer panel 37 and to the spark arrester screen 72. After passing through the discharge hole 37A and the spark arrester screen 72, the exhaust gas is discharged, while being guided by the exhaust gas-guiding member 75 which is disposed to cover the discharge hole 37A and the spark arrester screen 72, from the final discharge port 71 formed in the exhaust gas-guiding member 75 to the ambient in a predetermined direction (the left side as viewed from the rear side of the muffler 20).

In the muffler 20 of this embodiment, the exhaust gas is blown from the second expansion chamber 32 via the blowout holes 61, 62, 63 and 64 to the second air space "Sb" of the double wallportion 32A and, after passing through the second air space "Sb", to the discharge hole 37A. Since the second air space "Sb" has a considerably greater volume than that of a conventional exhaust gas passage member such as a tail pipe, the exhaust gas can cool down sufficiently while passing through the second air space "Sb". As a result, the final exhaust gas temperature is reduced significantly, to meet the prescribed upper limit value (for example, 246° C.), and sparks in the exhaust gas are extinguished in the second air space "Sb".

As the exhaust gas blown from the blowout holes 61, 62, 63 and 64 into the second air space "Sb" of large capacity expands rapidly, the noise level is reduced further.

With the spark arrester screen 72 disposed at the discharge hole 37A, even if some sparks are left unextinguished by the second air space "Sb", the sparks are fully prevented from being discharged to the ambient. Also, since the spark arrester screen 72 is disposed remote from the blowout holes 61, 62, 63 and 64, it is unlikely to be exposed to high-temperature exhaust gas. This enhances the durability and minimizes clogging of the spark arrester screen 72.

With the flow of exhaust gas being guided by the louver-like exhaust gas discharge portions 42A, 42B, 42C and 42D which are formed on the inner panel 42 for exhaust gas discharge from the blowout holes 61, 62, 63 and 64 into the second air space "Sb" and along the inner panel 42 and the outer panel 37, i.e. with blowout diverted by the exhaust gas discharge portions 42A, 42B, 42C and 42D for flow along the outer panel 37, the loss in discharge pressure of the exhaust gas is minimized. And since the area of openings is relatively large, throttling loss is minimized also.

Due to a suitable gap α formed between the exhaust gas discharge portions 42A, 42B, 42C and 42D and the outer panel 37, the outer panel 37 is not directly impinged by high-temperature exhaust gas from the second expansion chamber 32. Thus, the portion of the outer panel 37 in the vicinity of the blowout holes 61, 62, 63 and 64 is not unduly heated, and no undue thermal stress develops.

With different distances along the flow of exhaust gas from each of the blowout holes 61, 62, 63 and 64 to the final discharge port 71, sound waves will interfere with each other for further noise reduction.

Since, in the muffler 20 of this embodiment, the expansion chamber is perpendicularly divided by the partition plate 40 into the first expansion chamber 31 and the second expansion chamber 32, protrusions are more readily avoided, such as a boss formed on the internal combustion engine side in the attachment of the muffler, as compared with an expansion chamber which is divided horizontally by a partition plate. This facilitates attachment and assembly of the muffler. Also, it is easier to change the capacity of the muffler 20 and the volume ratio between the first expansion chamber 31 and the second expansion chamber 32.

With an oxidation catalyst 50 formed of a gas-permeable foamed body being used as an exhaust emission purifier, clogging of the catalyst is substantially prevented, and gas permeation resistance and output loss are minimized.

While, in the foregoing, one preferred embodiment of the invention has been described in detail for the purpose of illustration, it is understood that construction of the device can be varied without departing from the spirit and scope of the invention.

For example, while there are four blowout holes in the above embodiment, the number and shape of the blowout holes can be different. Further, the exhaust emission purifier 50 can be formed of a foamed body or a ceramic carrier. As for the manner of mounting the exhaust emission purifier 50 on the partition plate 40, various other methods, including adhesion can be employed.

As shown by a phantom line in FIG. 1, the ambient air inlet tube 26 can extend above the outer surface of the outer panel 36, thus providing for direct aspiration of ambient air rather than by way of the first air space "Sa".

A muffler according to this invention can be applied not only to the engine illustrated in the drawings, but also to other kinds of internal combustion engine, including four-stroke engines.

The invention provides for a muffler of simplified design, which reliably prevents sparks from being discharged to the ambient, and which reduces the final exhaust gas temperature. With reduced back pressure in the muffler, power loss is minimized, and ambient air can be introduced readily into the muffler, for minimization of CO.

We claim:

1. A muffler for an internal combustion engine comprising an expansion chamber (31, 32) having a gas inlet port (27) for admitting an exhaust gas emitted from an exhaust port of the internal combustion engine, and having an outer wall which is configured as a double wall (31A, 32A) comprising an inner panel (41, 42) and an outer panel (36, 37) spaced apart from the inner panel (41, 42) by a distance for forming an air space (Sa, Sb) therebetween; wherein:

the inner panel (42) has blowout holes (61, 62, 63, 64) for introducing an exhaust gas from the expansion chamber (32) into the air space (Sb), and the outer panel (37) has a discharge opening (37A) for discharging the exhaust gas from the air space (Sb) to an ambient.

2. The muffler according to claim 1, wherein the inner panel (42) has portions which are embossed toward the outer panel (37) so as to form a plurality of louver-like exhaust gas discharge portions (42A, 42B, 42C, 42D) which terminate in the respective blowout holes (61,62, 63,64), for an exhaust gas in the expansion chamber (32) to be directed by the exhaust gas discharge portions (42A, 42B, 42C, 42D) to be introduced into the air space (Sb) in a direction along the inner panel (42) and the outer panel (37).

3. The muffler according to claim 2, wherein the exhaust gas discharge portions (42A, 42B, 42C, 42D) are spaced from the outer panel (37).

4. The muffler according to claim 1, wherein:

the discharge opening (37A) is disposed at a rear side of the outer panel (37) remote from the gas inlet port (27);

the blowout holes (61, 62,63, 64) are disposed such that the exhaust gas introduced into the air space (Sb) from the blowout holes (61, 62, 63, 64) is directed toward the discharge opening (37A); and the blowout holes (61, 62,63, 64) are disposed such that distances from the blowout holes (61, 62, 63, 64) along exhaust gas flow to the discharge opening (37A) are different from each other.

5. The muffler according to claim 1, wherein the expansion chamber further comprises an exhaust gas-guiding member (75) disposed at the outer panel (37) so as to cover the discharge opening (37A), and having a final discharge port (71) to the ambient.

6. The muffler according to claim 1, wherein the expansion chamber further comprises:

a partition plate (40) which perpendicularly divides the expansion chamber (31, 32) into a first expansion chamber (31) and a second expansion chamber (32) such that the gas inlet port (27) is disposed in the first expansion chamber (31) and the blowout holes (61, 62, 63, 64) and the discharge opening (37A) are disposed in the second expansion chamber (32); and an exhaust emission purifier (50) disposed in an opening across the partition plate (40) for passing exhaust gas introduced through the gas inlet port (27) into the first expansion chamber (31) to the second expansion chamber (32).

7. The muffler according to claim 6, wherein the exhaust emission purifier (50) comprises an oxidation catalyst.

8. The muffler according to claim 6, wherein the expansion chamber further comprises an ambient air inlet means (25, 26) for aspirating ambient air into the first expansion chamber (31) in the vicinity of the gas inlet port (27).

9. The muffler according to claim 1, wherein the expansion chamber further comprises an ambient air inlet means (25, 26) for aspirating ambient air into the expansion chamber (31, 32) in the vicinity of the gas inlet port (27).

10. The muffler according to claim 1, wherein the expansion chamber further comprises a spark arrester screen (72) covering the discharge opening (37A).

* * * * *

UNITED STATES PATENT AND TRADEMARK OFFICE
CERTIFICATE OF CORRECTION

PATENT NO. : 5,857,327

DATED : January 12, 1999

INVENTOR(S) : Sato et al.

It is certified that error appears in the above-identified patent and that said Letters Patent is hereby corrected as shown below:

```
       Title page, item [56] References Cited, FOREIGN PATENT DOCUMENTS: Insert :
-- 53-43930   7/1998   Japan--.
```

Signed and Sealed this

Twenty-first Day of March, 2000

*Attest:*

Q. TODD DICKINSON

*Attesting Officer*  *Commissioner of Patents and Trademarks*